United States Patent [19]
Nguyen

[11] Patent Number: 5,165,269
[45] Date of Patent: Nov. 24, 1992

[54] ELECTRONIC FLUX GATE COMPASS CALIBRATION TECHNIQUE

[75] Inventor: Duc C. Nguyen, Salem, Oreg.
[73] Assignee: IIMorrow, Inc., Salem, Oreg.
[21] Appl. No.: 604,220
[22] Filed: Oct. 29, 1990
[51] Int. Cl.$^5$ ............................................. G01C 25/00
[52] U.S. Cl. ....................................... 73/1 E; 33/356
[58] Field of Search ................... 73/1 E; 33/356, 357; 364/571.01, 571.02, 571.04, 571.05, 571.06, 559

[56] References Cited

U.S. PATENT DOCUMENTS

| | | | |
|---|---|---|---|
| 4,660,161 | 4/1987 | Okada | 33/356 |
| 4,672,565 | 6/1987 | Kuno et al. | 33/356 |
| 4,866,627 | 9/1989 | Suyama | 33/356 |
| 5,046,031 | 9/1991 | Wanous | 33/356 |

Primary Examiner—Robert Raevis
Attorney, Agent, or Firm—William A. Birdwell & Associates

[57] ABSTRACT

An electronic flux gate compass calibration method and apparatus. An electronic flux gate compass mounted on a terrestrial vehicle is first rotated 360 degrees by driving the vehicle in a circle to determine four reference points where the locus of points representing the orthogonal outputs of the compass crosses over the X and Y axes of a reference Cartesian coordinate system. These four reference points are employed to calibrate the orthogonal outputs of the compass and compute a calibrated compass heading. Thereafter, as the vehicle moves from place to place, the output of the compass is monitored. If the output is within a predetermined region around one of the reference points, the reference point is modified to be closer to that output point. When the vehicle has moved through a closed loop, i.e., rotated a net 360 degrees, the compass is recalibrated.

25 Claims, 5 Drawing Sheets

ELECTRONIC FLUX GATE COMPASS CALIBRATION TECHNIQUE

BACKGROUND OF THE INVENTION

This invention relates to electronic flux gate compasses, and particularly to techniques for calibrating the output of an electronic flux gate compass to compensate for disturbances in the Earth's magnetic field caused by localized magnetic material, such as parts of a vehicle in which the compass is mounted, and asymmetrical properties of the flux gate compass circuitry.

Electronic flux gate compasses are devices that provide electrical signals indicative of direction, based on a measurement of the strength of the Earth's field in the direction that the compass is pointed. Typically, this is accomplished by providing a pair of orthogonal sense coils wrapped around a torroidal core of magnetic material that is periodically saturated and unsaturated, thereby generating as outputs from said sense coils periodic signals representative of the magnetic flux from the Earth's magnetic field passing through the respective coils. These outputs represent the magnitudes of vectors on respective axes of a reference Cartesian coordinate system associated with the compass rotated some angle $\theta$ with respect to magnetic north so that their vector sum represents magnetic north, and the angle of rotation of the Cartesian coordinate system represents the direction that the compass is pointed with respect to magnetic north. A device of this type is described in the copending U.S. Pat. application of Roth et. al., Ser. No. 07/388579, entitled "Magnetometer and Magnetic Field Strength Measurement Method."

Electronic flux gate compasses are increasingly used in position and navigation systems for vehicles, particularly terrestrial vehicles. When installed in a vehicle, or when moved near a significantly large piece 2f magnetic material, magnetic interference caused by the vehicle or other nearby magnetic material may reduce the accuracy of the compass, or even render it useless. Such interference may be caused by magnetically "hard" material which retains for a relatively long time magnetism induced by a local magnetic field when the material is formed and shaped, or it may be caused by magnetically "soft" material whose magnetism is induced by the presence of an external magnetic field and changes with vehicle orientation. Also, asymmetrical characteristics of the electrical circuits which detect and amplify the outputs from the sense coils may produce distortion in the output of the compass.

Ideally, the vector sum of the two outputs of an electronic flux gate compass, which represents the Earth's magnetic field vector, would trace a circle centered on the Cartesian coordinate system of the compass as the compass is rotated 360 degrees in the presence of the Earth's magnetic field. However, in the presence of hard magnetic material the apparent center of rotation of the Earth's magnetic field vector is offset from the center of the coordinate system of the compass. In addition, the presence of soft magnetic material and asymmetrical characteristics of the compass circuitry often cause the vector sum to trace an ellipse, rather than a circle. A vehicle in which the compass is mounted may contain hard magnetic material, soft magnetic material, or both.

A number of techniques have been developed for correcting distortion produced in the output of a flux gate compass as a result of the presence of local magnetic material. For example, in Moulin et. al. U.S. Pat. No. 4,414,753 a set of data is generated representing an ellipse rotated with respect to a reference axis as a vehicle is driven in a circle, and general mathematical equations are solved to calculate coefficients for transforming the ellipse to a circle and translating the center of the circle to the true center of the reference coordinate system of the compass. A similar technique is disclosed in Marchant et. al. U.S. Pat. No. 4,546,550.

In Mattern et. al. U.S. Pat. No. 3,991,361, a correction vector is found from the halved vector sum of maximum and minimum values of the magnetic field as a magnetic probe is rotated in a circle to correct for the offset of the ideal circle from the actual center of the coordinate system of the probe. A similar technique is disclosed in Scherer et. al. U.S. Pat. No. 4,416,067.

However, none of these techniques discloses any way of simply and continuously updating the calibration of a flux gate compass in a terrestrial vehicle as that vehicle moves from place to place. Rather, they each require that the vehicle be stopped, at least momentarily, and driven in a circle to recalibrate the compass. This is a time consuming task, and there is a need, particularly in the efficient use of package delivery vehicles, to avoid such inefficiencies.

SUMMARY OF THE INVENTION

The present invention provides a method and apparatus for continuously updating the calibration of a flux gate compass in a terrestrial vehicle as that vehicle moves from place to place. It performs an initial calibration as the vehicle is driven in a circle at the starting location, thereby establishing four reference points, respectively, where the locus of points generated by the compass output intersects the axes of a translated Cartesian coordinate system. These four reference points are used to compute compass calibration coefficients, that is, coefficients representing the offset of the center of the translated coordinate system from the center of a reference Cartesian coordinate system and representing the magnitude of the distortion of that locus of points from a circle to an ellipse. Thereafter, as the vehicle is driven from place to place the output of the flux gate compass is compared to these reference points. If the output is within a predetermined region around a reference point, the reference point is modified by that output. Once all four reference points have been modified, that is, when the vehicle has been driven in a complete circle, new compass calibration coefficients are computed.

Therefore, it is a principal objective of the present invention to provide a new and improved method and apparatus for calibrating the output of an electronic flux gate compass.

It is another objective of the present invention to provide an electronic flux gate compass calibration method and apparatus that corrects for both offset of the locus of points representative of the compass output with respect to a reference Cartesian coordinate system and distortion of that locus of points from a circle to an ellipse.

It is a further objective of the present invention to provide an electronic flux gate compass calibration method and apparatus that continuously calibrates a compass mounted on a vehicle as the vehicle travels from place to place.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
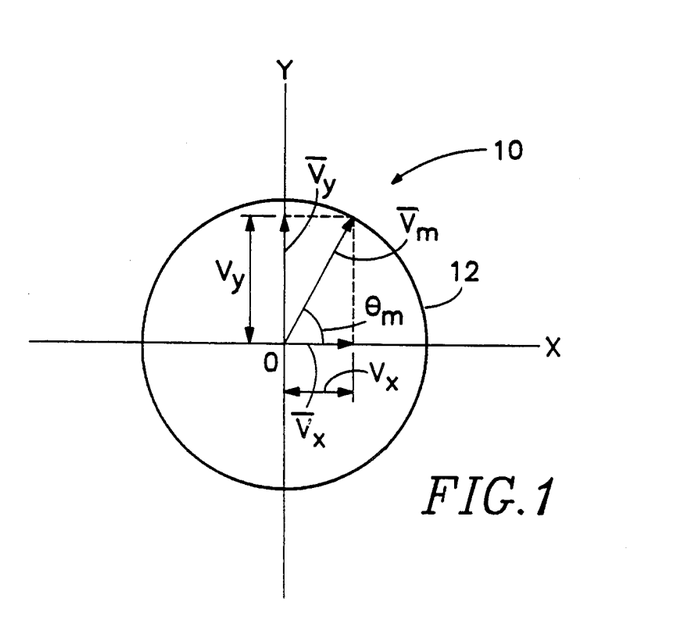
FIG. 1 is a vector diagram showing a vector $\overline{V}_m$, corresponding to the output of an ideal electronic flux gate compass in the absence of magnetic interference, and representative of the magnitude and direction of the Earth's magnetic field intensity with respect to a reference Cartesian coordinate system of the electronic flux gate compass, and the X and Y components of that vector $\overline{V}_x$ and $\overline{V}_y$.

Turning first to FIG. 1, a typical, ideal electronic flux gate compass produces two outputs having magnitudes $V_x$ and $V_y$ representing, respectively, in the absence of magnetic field interference, the magnitude of vector components of the Earth's magnetic field along the X and Y axes, respectively, of a reference Cartesian coordinate system 10 associated with the flux gate compass. Vector components $\overline{V}_x$ and $\overline{V}_y$ add to form the compass output vector $\overline{V}_m$ which represents the magnetic field. The angle $\theta_m$ between the compass output vector $\overline{V}_m$ and the X axis of the Cartesian coordinate system 10 represents the angle of the flux gate compass with respect to magnetic north of the Earth's magnetic field. If the compass is rotated 360 degrees the compass output vector $\overline{V}_m$ will trace out a locus of points 12 which forms a circle whose center is at the origin O of the Cartesian coordinate system.

Figure 2:
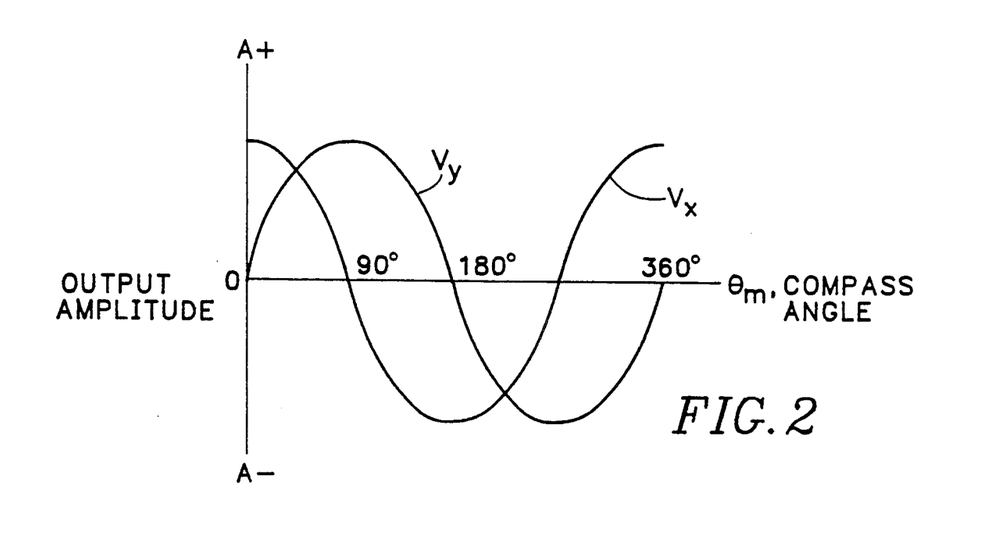
FIG. 2 is a diagram representing the amplitude of the X and Y output signals produced by an idealized electronic flux gate compass in the absence of magnetic interference.

The amplitude of the vector components $\overline{V}_x$ and $\overline{V}_y$, corresponding to the respective orthogonal outputs of the flux gate compass, are shown as a function of the compass angle $\theta_m$ in FIG. 2. In that figure the amplitude of A of those outputs may be positive or negative in magnitude. These figures assume that the flux gate compass is not in close proximity to magnetic material which would distort the local magnetic field, and that the circuitry of the compass is balanced. However, that is not ordinarily the case. It is difficult to construct a real magnetic flux gate compass whose circuits are adequately balanced within an acceptable range of tolerance and such a compass is ordinarily mounted in a vehicle which, in addition to other pieces of magnetic material near which the vehicle may be located, has its own magnetic field distortion characteristics which vary over time and circumstances. Consequently, the idealized results shown in FIGS. 1 and 2 rarely occur.

Figure 3:
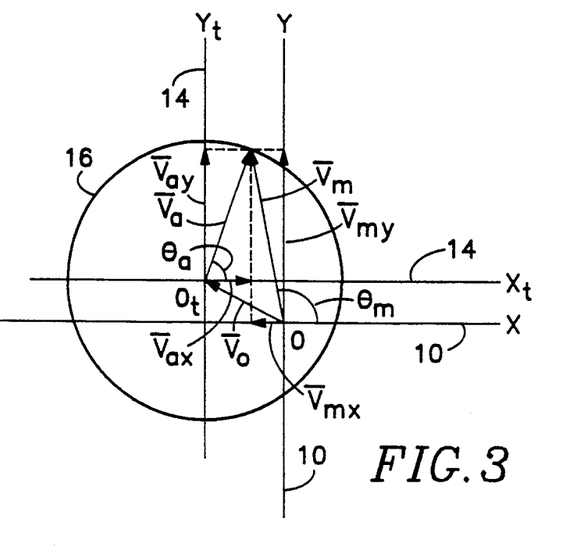
FIG. 3 is a vector diagram showing the altered compass output vector $\overline{V}_m$ of an ideal electronic flux gate compass, and the X and Y components of that vector $\overline{V}_{mx}$ and $\overline{V}_{my}$, in the presence of hard magnetic field interference; with respect to the reference Cartesian coordinate system of the compass a Cartesian coordinate system represented by axes $X_t$ and $Y_t$ whose origin is translated from the origin of the references coordinate system by an offset represented by vector $\overline{V}_o$; and the actual Earth's magnetic field intensity vector $\overline{V}_a$ and its components $\overline{V}_{ax}$ and $\overline{V}_{ay}$.

Turning to FIG. 3, assuming that the circuitry of the flux gate compass is balanced, distortions in the local magnetic field, ordinarily caused by hard magnetic material in the vehicle in which the flux gate compass is mounted, typically produce an offset vector $\overline{V}_o$ which, in effect, produces a translated Cartesian coordinate system 14 having axes $X_t$ and $Y_t$ and an origin $O_t$. The outputs of the flux gate compass comprise vector components $\overline{V}_{mx}$ and $\overline{V}_{my}$, which add to form $\overline{V}_m$, but $\overline{V}_m$ is not the Earth's magnetic field vector; rather, it is the vector sum of the actual Earth's magnetic field vector $\overline{V}_a$ and the offset vector $\overline{V}_o$. As the compass is rotated 360 degrees the distorted magnetic field produces a circular locus of points 16 which is centered about the translated coordinate system 14 rather than the reference coordinate system 10, and is therefore misleading. Thence, in the absence of correction, $\overline{V}_m$ falsely suggests that the direction that the compass heading is represented by the angle $\theta_m$, whereas it is actually $\theta_a$.

Figure 4:
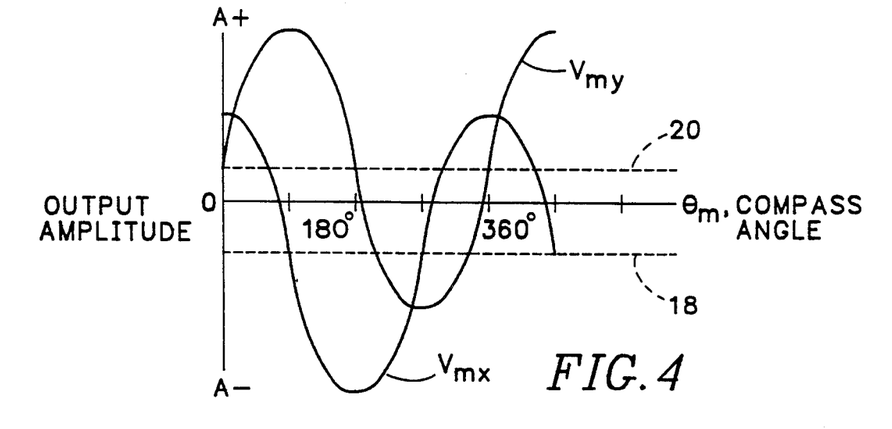
FIG. 4 is a diagram of the amplitude of the outputs of an idealized electronic flux gate compass, i.e., one whose X and Y circuits are perfectly balanced, in the presence of hard magnetic field interference.

The true magnetic field vector is obtained by subtracting the offset vector $\overline{V}_o$ from the output vector $\overline{V}_m$ to obtain $\overline{V}_a$, which represents the actual direction $\theta_a$ that the compass is headed with reference to magnetic north. The angle $\theta_a$ is obtained by finding the arctangent of the ratio of the $Y_t$ and $X_t$ components of $V_a$, that is, arctangent $V_{ay}/V_{ax}$ FIG. 4 shows that, while the peak to peak amplitudes of the $V_{mx}$ and $V_{my}$ compass output components are not affected by the local distortion of the magnetic field, in the example given the average amplitude of the $V_{mx}$ component 18 shifts to a negative value, while the average amplitude of the $V_{my}$ component shifts to a positive value 20.

Figure 5:
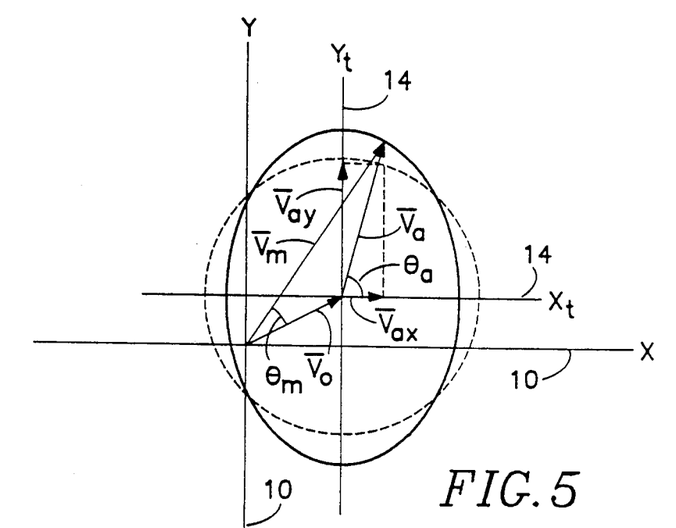
FIG. 5 is a vector diagram showing the altered compass output vector $\overline{V}_m$, the offset vector $\overline{V}_o$, and the actual Earth's magnetic field intensity vector $\overline{V}_a$ where there is hard magnetic field interference, and soft magnetic field interference, an imbalance in the X and Y circuits of the flux gate compass, or both soft interference and an imbalance in the circuits.
Figure 6:
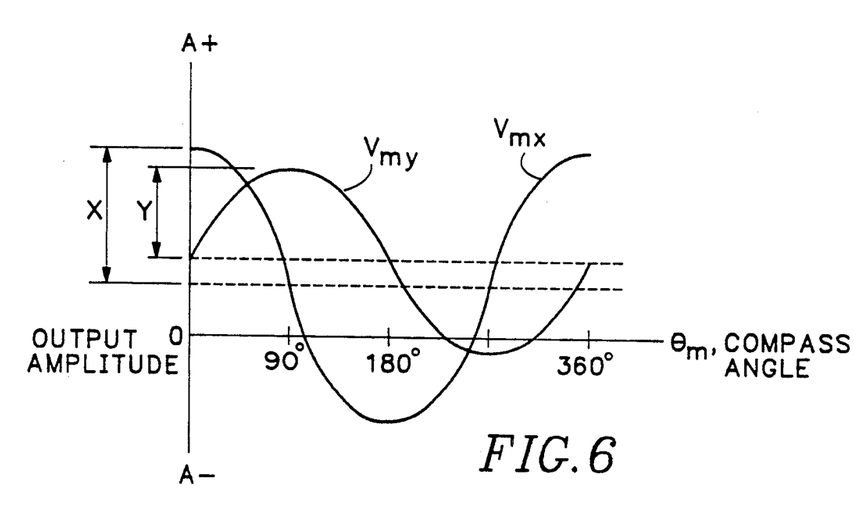
FIG. 6 is a diagram representing the amplitude of the outputs of an electronic flux gate compass under the conditions shown by the diagram in FIG. 5.

The vector diagram in FIG. 5 shows that when, in addition to hard magnetic material interference, there is soft magnetic material interference or the electrical circuits of the flux gate compass are not balanced, the identification of the actual Earth magnetic field intensity vector becomes more complex. In addition to the offset caused by hard magnetic material interference, the locus of points generated by the compass output is distorted to an elliptical, rather than a circular, shape by either soft magnetic interference or electrical circuit imbalance or both. To obtain the actual magnetic field intensity vector $\overline{V}_a$, $\overline{V}_o$ must be subtracted from $\overline{V}_m$ and the resultant vector must be normalized. FIG. 6 shows that in this case the peak-to-peak amplitudes of $V_{mx}$ and $V_{my}$ differ.

According to the present invention, these problems are corrected by the procedure described below. First, assuming that the flux gate compass is installed in a vehicle, the vehicle is rotated 360 degrees; that is, driven in a closed loop within a predetermined area, at its initial location to obtain the maximum and minimum values for each of the x and y components of vector $V_m$, that is: $X_{max}$, $X_{min}$, $Y_{max}$, $Y_{min}$. Then, calibration coefficients are computed as follows:

$$X_{off} = (X_{max} + X_{min})/2$$

$$Y_{off} = (Y_{max} + Y_{min})/2$$

$$X_{scale} = (X_{max} - X_{min})/2$$

$$Y_{scale} = (Y_{max} - Y_{min})/2$$

where:
  $X_{off}$ = the magnitude of the X axis component of $\overline{V}_o$,
  $Y_{off}$ = the magnitude of the Y axis component of $\overline{V}_o$,
  $X_{scale}$ = the X scaling factor by which the vector $\overline{V}_c - \overline{V}_o$ is normalized, and
  $Y_{scale}$ = the Y scaling factor by which the vector $\overline{V}_c - \overline{V}_o$ is normalized.

$X_{off}$ and $Y_{off}$ are the coordinates of the center of the ellipse, i.e., the coordinates with respect to reference coordinate system 10 of the origin $O_t$ of the translated coordinate system 14. $X_{scale}$ and $Y_{scale}$ are used to transform the ellipse back to a circle. By applying these coefficients to the flux gate compass outputs X and Y before computing the heading of the vehicle in which the compass is mounted, magnetic interferences are eliminated and the "ideal" behavior of the compass is restored. They are applied as follows:

$$X_a = (X_m + X_{off})/X_{scale}$$

$$Y_a = (Y_m + Y_{off})/Y_{scale}, \text{ and}$$

$$\theta_a \text{ arctangent } (Y_a/X_a),$$

where
  $X_a$ = the calibrated X component of the compass output, and
  $Y_a$ = the calibrated Y component of the compass output.

The above calibration procedure is done once at the initial installation and should remain valid if the vehicle's magnetic signature does not change. In reality, the magnetic signature of the vehicle does alter over time; that is, the ellipse shifts and changes its shape. Therefore, the calibration procedure has a second part designed to provide continuous compass calibration by detecting the gradual movement of the ellipse, along with the change of its shape as the vehicle performs its daily routine.

After the initial calibration, four points where the ellipse intercepts the translated axes $X_t$ and $Y_t$ are established: $(X_{max}, Y_{off})$, $(X_{min}, Y_{off})$, $(X_{off}, Y_{max})$, $(X_{off}, Y_{min})$. As the vehicle travels from place to place, the X and Y outputs from the compass are used along with the calibration coefficients $(X_{off}, Y_{off}, X_{scale}, Y_{scale})$ to produce the current heading $\theta_m$. In addition, when the output point $(X_m, Y_m)$ is close enough to any one of the four intercepts above using the following criteria:

If
  $abs(X_m - X_{max}) < K_1$, and
  $abs(Y_m - Y_{off}) < K_2$, or
  $abs(X_m - X_{min}) < K_1$ and
  $abs(Y_m - Y_{off}) < K_2$, or
  $abs(Y_m - Y_{max}) < K_2$ and
  $abs(X_m - X_{off}) < K_1$, or
  $abs(Y_m - Y_{min}) < K_2$ and
  $abs(X_m - X_{off}) < K_1$, where $K_a$ and $K_2$ are empirically determined values that may or may not be equal, then the corresponding initial values of $X_{max}$, $X_{min}$, $Y_{max}$ or $Y_{min}$ are modified as follows:

where $K_1$ and $K_2$ are empirically determined values that may or may not be equal, then the corresponding initial values of $X_{max}$, $X_{min}$, $Y_{max}$ or $Y_{min}$ are modified as follows:

$$X_{max} = X_{max} + C * (X_m - X_{max}), \text{ or}$$

$$X_{min} = X_{min} + C * (X_m - X_{min}), \text{ or}$$

$$Y_{max} = Y_{max} + C * * (Y_m - Y_{max}), \text{ or}$$

$$Y_{min} = Y_{min} + C * (Y_m - Y_{min}).$$

where C is an empirically-determined constant.

Figure 7:
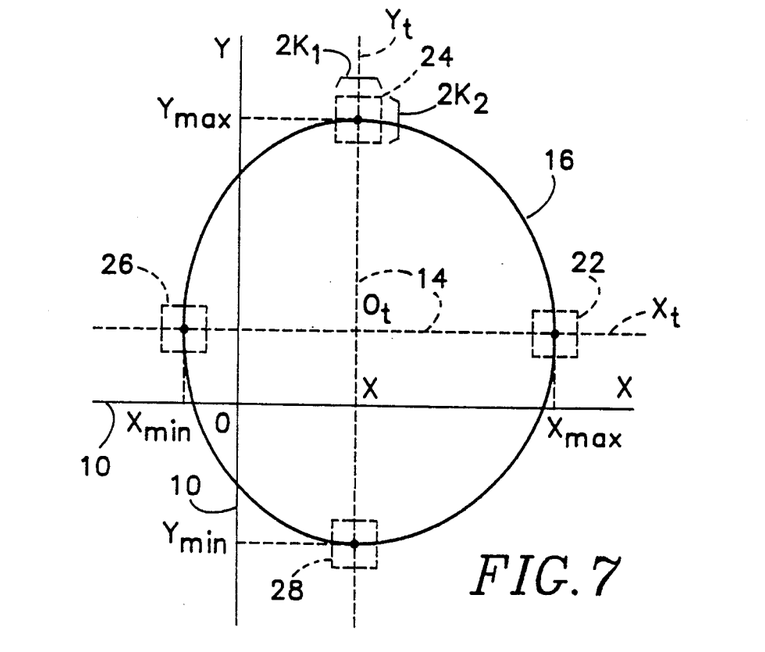
FIG. 7 is a diagram of the locus of points produced by an electronic flux gate compass where there is hard magnetic field interference, and soft magnetic field interference, an imbalance in the X and Y circuits of the flux gate compass, or both soft interference and an imbalance in the circuits, showing regions around the intercepts of the locus of points with the translated axes $X_t$ and $Y_t$ used for reference in recalibrating the compass.

This is illustrated graphically in FIG. 7. It can be seen that $X_{max}$, $Y_{max}$, $X_{min}$ and $Y_{min}$, represent the maximum values of the $X_m$ and $Y_m$ outputs of the flux gate compass (with respect to the reference coordinate system) where they intersect $X_t$ and $Y_t$ axes of the translated coordinate system 14. In this calibration scheme, it is assumed that if the maximum and minimum measured values of X and Y fall within a predetermined region around the current $X_{max}$, $Y_{max}$, then a modification should be made.

Figure 8:
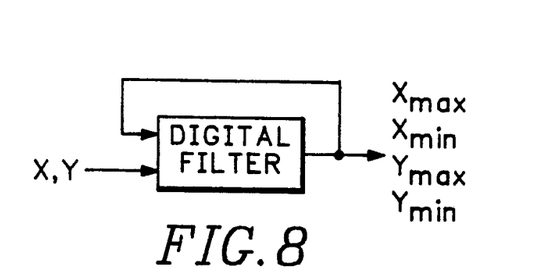
FIG. 8 is a simplified diagram representing a digital filter for use in computing the new maximum or minimum value if the compass output is close to the corresponding reference point according to the present invention.

In FIG. 7, rectangles 22, 24, 26, and 28 represent such regions. Region 22 is defined in the X direction by $X_{max} \pm K_1$ and $Y_{off} \pm K_2$. Region 24 is defined by $Y_{max} \pm K_2$ and $X_{off} \pm K_1$. Similarly, region 26 is defined by $X_{min} \pm K_1$ and $Y_{off} \pm K_2$. Finally, region 28 is defined by $Y_{min} \pm K_2$ and $X_{off} \pm K_1$. Determination of the appropriate constants for defining these areas is accomplished empirically. That is, experiments are performed to determine what constant lead to acceptably consistent, accurate, and repeatable results. Once four new $X_{max}$, $Y_{max}$, $X_{min}$ and $Y_{min}$ values have been determined, new $X_{off}$, $Y_{off}$, $X_{scale}$ and $Y_{scale}$ values may be computed. Preferably, that is done digitally as is represented by the weighted digital filter represented by FIG. 8, where the constant C is a made a characteristic of that filter. Such a filter can be realized by a computer program, as is commonly known in the art.

Figure 9:
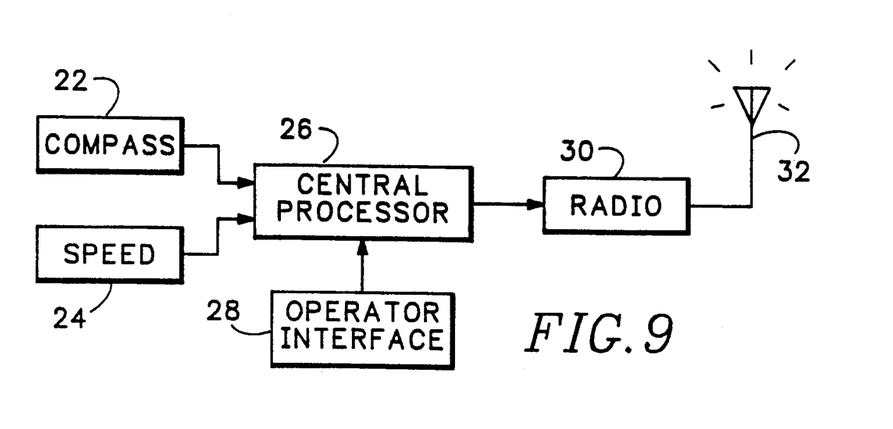
FIG. 9 is a block diagram of a navigation system of the type in which the compass calibration technique of the present system might be incorporated.

Ordinarily, the correction would be accomplished by a digital processor, as shown, for example, in the system of FIG. 9. In that system, a flux gate compass 22 and the speedometer 24 provide digitized inputs to a central processor 26, having an operator interface, such as a keyboard 28. The output from the central processor 26 is fed to a radio 30 which transmits speed and bearing to a central navigation monitoring station via antenna 32.

Figure 10:
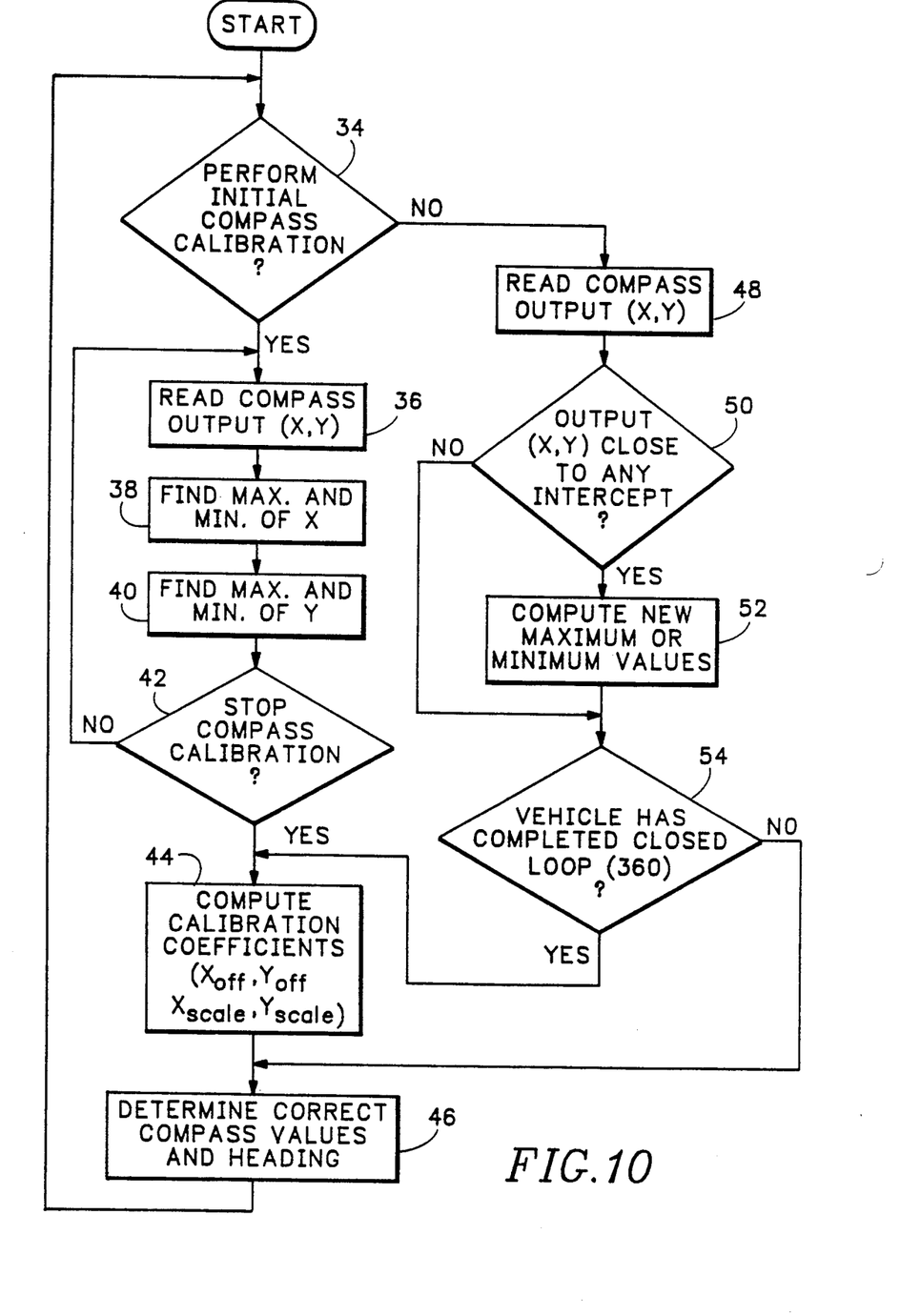
FIG. 10 is a flow chart of a computational scheme for calibrating the output of an electronic flux gate compass according to the present invention.

In such a system, the central processor 26 would include a computer program for performing the aforedescribed calibration technique, as shown in the flow chart of FIG. 10. That is, beginning at step 34, the processor first inquires of the operator as to whether an initial compass calibration should be performed. If so, the operator drives the vehicle in a circle at a starting location. The processor reads the compass outputs $X_m$ and $Y_m$ periodically, as indicated by step 36. The maximum and minimum values of X are found in step 38, and the maximum and minimum values of Y are found in step 40. At step 42 the operator has a choice of repeating the process or stopping and allowing the compass to be calibrated.

Once the initial calibration procedure is stopped, calibration coefficients $X_{off}$, $Y_{off}$, $X_{scale}$ and $Y_{scale}$ are computed in step 44. These are used in step 46 to compute $X_a$, $Y_a$ and the heading $\theta_a$, as described above. Meanwhile, the system returns to decision step 34.

In order for the system to work properly, an initial calibration must be performed at least once. Thereafter, if the operator chooses at step 34 not to perform an initial calibration, the compass output values will nevertheless be read in step 48. In step 50, the system will determine whether the current values are within predetermined amounts of the current $(X_{max}, Y_{off})$, $(X_{min}, Y_{off})$, $(Y_{max}, X_{off})$ and $(Y_{min}, X_{off})$ intercepts. If so, then in step 52, the corresponding maximum or minimum values are modified. If not, the modification step 52 is skipped.

If the vehicle has completed a 360 degree loop, which is determined at step 54, the new calibration coefficients are computed at step 44. If not, the correct compass values continue to be determined using existing calibration coefficients and the entire process is started anew.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A method for calibrating an electronic flux gate compass having at least a first output $X_m$ representing magnetic field intensity in a first direction and a second output $Y_m$ representing magnetic field intensity in a second, orthogonal direction, comprising:

(a) rotating said compass 360 degrees while said compass is maintained within a predetermined area defined by said first and said second orthogonal directions;

(b) during step (a), reading the maximum value of said first output $X_{max}$, the minimum value of said first output $X_{min}$, the maximum value of said second output $Y_{max}$, and the minimum value of said second output $Y_{min}$;

(c) computing offset values $X_{off}$ and $Y_{off}$, as follows:

$X_{off} = (X_{max} + X_{min})/2$ $Y_{off} = (X_{max} + Y_{min})/2$;

(d) thereafter periodically reading said first output and said second output while said compass is moved;

(e) if:
    $abs(X_x - X_{max}) - K_1$ and $abs(Y_m - Y_{off}) - K_2$, then set $X_{max} = X_{max} + C * (X_m - X_{max})$, or
    $abs(X_m - X_{min}) - K_1$ and $abs(Y_m - Y_{off}) - K_2$, then set $X_{min} = X_{min} + C * (X_m - X_{min})$, or
    $abs(Y_m - Y_{max}) - K_2$ and $abs(X_m - X_{off}) - K_1$, then set $Y_{max} = Y_{max} + C * (Y_m - Y_{max})$, or
    $abs(Y_m - Y_{min}) - K_2$ and $abs(X_m - X_{off}) - K_1$, then set $Y_{min} = Y_{min} + C * (Y_m - Y_{min})$,
    where $K_1$, $K_2$, and C are predetermined constants; and (f) if and when the compass has been moved through a net 360 degrees, compute new $X_{off}$ and $Y_{off}$ values in accordance with step (c).

2. The method of claim 1, further comprising during step (c) also computing scale values, as follows:

$X_{scale} = (X_{max} + X_{min})/2$ $Y_{scale} = (Y_{max} - Y_{min})/2$, and in step (f) also recomputing said scale values.

3. The method according to claim 2, wherein $K_1$, $K_2$, and C are empirically determined values.

4. The method according to claim 3, wherein steps (d) through (f) are carried out repetitively.

5. The method according to claim 4, wherein in step (e), $X_m$ and $Y_m$ values are weighted to have less significance than $X_{max}$, $X_{min}$, $Y_{max}$ and $Y_{min}$ values.

6. The method according to claim 4, further comprising calibrating said compass by the following computations:

$X_a = (X_m + X_{off})/X$ scale, $Y_a = (Y_m + Y_{off})/Y$ scale, and $\theta_a = \arctan{(Y_a/X_a)}$ where $X_a$ represents the calibrated compass value in said first direction, $Y_a$ represents the calibrated compass value in said second direction, and $\theta_a$ represents the calibrated compass heading with respect to magnetic north.

7. The method according to claim 3, wherein in step (e), $X_m$ and $Y_m$ values are weighted to have less significance than $X_{max}$, $X_{min}$, $Y_{max}$ and $Y_{min}$ values.

8. The method according to claim 7, further comprising calibrating said compass by the following computations:

$X_a = (X_m + X_{off})/X$ scale, $Y_a = (Y_m + Y_{off})/Y$ scale, and $\theta_a = \arctan{(Y_a/X_a)}$ where $X_a$ represents the calibrated compass value in said second direction, and $\theta_a$ represents the calibrated compass heading with respect to magnetic north.

9. The method according to claim 3, further comprising calibrating said compass by the following computations:

$X_a = (X_m + X_{off})/X$ scale, $Y_a = (Y_m + Y_{off})/Y$ scale, and $\theta_a =$ arctangent $(Y_a/X_a)$ where $X_a$ represents the calibrated compass value in said first direction, $Y_a$ represents the calibrated compass value in said second direction, and $\theta_a$ represents the calibrated compass heading with respect to magnetic north.

10. The method according to claim 1 wherein $K_1$, $K_2$, and C are empirically determined values.

11. The method according to any of claim 1-10, wherein steps (d) through (f) are carried out repetitively.

12. The method according to claim 11, wherein step (e), $X_m$ and $Y_m$ values are weighted to have less significance than Xmax, Xmin, Ymax and Ymin values.

13. The method according to claim 11, further comprising calibrating said compass by the following computations:

$X_a = (X_m + X_{off})/X$ scale, $Y_a = (Y_m + Y_{off})/Y$ scale, and $\theta_a =$ arctangent $(Y_a/X_a)$ where $X_a$ represents the calibrated compass value in said first direction, $Y_a$ represents the calibrated compass value in said second direction, and $\theta_a$ represents the calibrated compass heading with respect to magnetic north.

14. The method according to any of claim 1-10, wherein in step (e), $X_m$ and $Y_m$ values are weighted to have less significance than $X_{max}$, $X_{min}$, $Y_{max}$ and $Y_{min}$ values.

15. The method according to claim 14, further comprising calibrating said compass by the following computations:

$X_a = (X_m + X_{off})/X$ scale, $Y_a = (Y_m + Y_{off})/Y$ scale, and $\theta_a =$ arctangent $(Y_a/X_a)$ where $X_a$ represents the calibrated compass value in said first direction, $Y_a$ represents the calibrated compass value in said second direction, and $\theta_a$ represents the calibrated compass heading with respect to magnetic north.

16. The method according to any of claim 1-10, further comprising calibrating said compass by the following computations:

$X_a = (X_m + X_{off})/X$ scale, $Y_a = (Y_m + Y_{off})/Y$ scale, and $\theta_a =$ arctangent $(Y_a/X_a)$ where $X_a$ represents the calibrated compass value in said first direction, $Y_a$ represents the calibrated compass value in said second direction, and $\theta_a$ represents the calibrated compass heading with respect to magnetic north.

17. An apparatus for calibrating an electronic flux gate compass having at least a first output $X_m$ representing magnetic field intensity in a first direction and a second output $Y_m$ representing magnetic field intensity in a second, orthogonal direction, said apparatus comprising:

(a) rotating means for rotating said compass 260 degrees while said compass is maintained within a predetermined area defined by said first and said second orthogonal directions;

(b) means for reading the maximum value of said first output $X_{max}$, the minimum value of said first output $X_{min}$, the maximum value of said second output $Y_{max}$, and the minimum value of said second output $Y_{min}$ while said compass is being rotated by said rotating means;

(c) offset computing means for computing offset values $X_{off}$ and $Y_{off}$ as follows:

$X_{off} = (X_{max} + X_{min})/2$ $Y_{off} = (Y_{max} + Y_{min})/2;$ (d) means for periodically reading said first output and said second output while said compass is moved;

(e) means for performing the computations: if
abs$(X_m - X_{max}) < K_1$ and abs$(Y_m - Y_{off}) < K_2$, then set $X_{max} = X_{max} + C * (X_m - X_{max})$, or
abs$(X_m - X_{min}) < K_1$ and abs$(Y_m - Y_{off}) < K_2$, then set $X_{min} = X_{min} + C * (X_m - X_{min})$, or
abs$(Y_m - Y_{max}) < K_2$ and abs$(X_m - X_{off}) < K_1$, then set $Y_{max} = Y_{max} + C * (Y_m - Y_{max})$, or
abs$(Y_m - Y_{min}) < K_2$ and abs$(X_m - X_{off}) < K_1$, then set $Y_{min} = Y_{min} + C * (Y_m - Y_{min})$,
where $K_1$, $K_2$, and C are predetermined constants; and (f) means for causing said offset computing means to recompute $X_{off}$ and $Y_{off}$ if and when the compass has been moved through a net 360 degrees.

18. The apparatus of claim 17, further comprising means for computing scale values, as follows:

$X_{scale} = (X_{max} - X_{min})/2$ $Y_{scale} = (Y_{max} - Y_{min})/2.$

19. The apparatus of either of claims 17 or 18, wherein $K_1$, $K_2$, and C are empirically determined values.

20. The apparatus of claim 19, further comprising means for weighing X and Y values so as to have less significance than $X_{max}$, $X_{min}$, $Y_{max}$ and $Y_{min}$ values.

21. The apparatus of claim 20, further comprising calibrating said compass by the following computations:

$$X_a = (X_m + X_{off})/X \text{ scale},$$

$$Y_a = (Y_m + Y_{off})/Y \text{ scale},$$

and $$\theta_a = \text{arctangent } (Y_a/X_a)$$

where $X_a$ represents the calibrated compass value in said first direction, $Y_a$ represents the calibrated compass value in said heading with respect to magnetic north.

22. The apparatus of claim 19, further comprising calibrating said compass by the following computations:

$$X_a = (X_m + X_{off})/X \text{ scale},$$

$$Y_a = (Y_m + Y_{off})/Y \text{ scale},$$

and $$\theta_a = \text{arctangent } (Y_a/X_a)$$

where $X_a$ represents the calibrated compass value in said first direction, $Y_a$ represents the calibrated compass value in said second direction, $\theta_a$ represents the calibrated compass heading with respect to magnetic north.

23. The apparatus of either of claims 17 or 18 further comprising means for weighting X and Y values so as to have less significance than $X_{max}$, $X_{min}$, $Y_{max}$, and $Y_{min}$ values.

24. The apparatus of claim 23, further comprising calibrating said compass by the following computations:

$$X_a = (X_m + X_{off})/X \text{ scale},$$

$$Y_a = (Y_m + Y_{off})/Y \text{ scale},$$

and $$\theta_a = \text{arctangent } (Y_a/X_a)$$

where $X_a$ represents the calibrated compass value in said first direction, $Y_a$ represents the calibrated compass value in said second direction, $\theta_a$ represents the calibrated compass heading with respect to magnetic north.

25. The apparatus of either of claims 17 or 18 further comprising calibrating said compass by the following computations:

$$X_a = (X_m + X_{off})X \text{ scale},$$

and $$Y_a = (Y_m + Y_{off})/Y \text{ scale},$$

and $$\theta_a = \text{arctangent } (Y_a/X_a)$$

where $X_a$ represents the calibrated compass value in said first direction, $Y_a$ represents the calibrated compass value in said second direction, $\theta_a$ represents the calibrated compass heading with respect to magnetic north.

* * * * *